(No Model.) S. J. WILFORD. 4 Sheets—Sheet 1.
DEVICE FOR CIRCULATING WATER OF BOILERS AND REMOVING IMPURITIES THEREFROM.

No. 534,773. Patented Feb. 26, 1895.

(No Model.) S. J. WILFORD. 4 Sheets—Sheet 3.
DEVICE FOR CIRCULATING WATER OF BOILERS AND REMOVING IMPURITIES THEREFROM.

No. 534,773. Patented Feb. 26, 1895.

(No Model.)
S. J. WILFORD.
4 Sheets—Sheet 4.
DEVICE FOR CIRCULATING WATER OF BOILERS AND REMOVING IMPURITIES THEREFROM.
No. 534,773.
Patented Feb. 26, 1895.
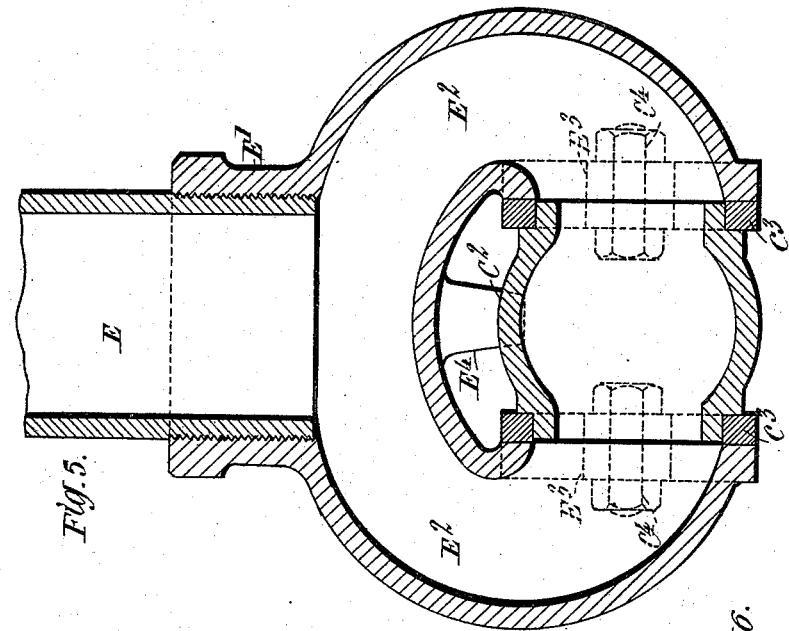
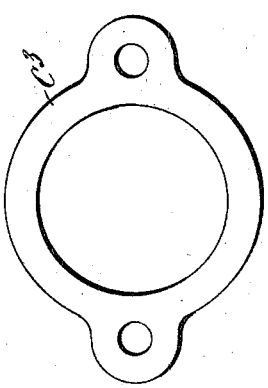
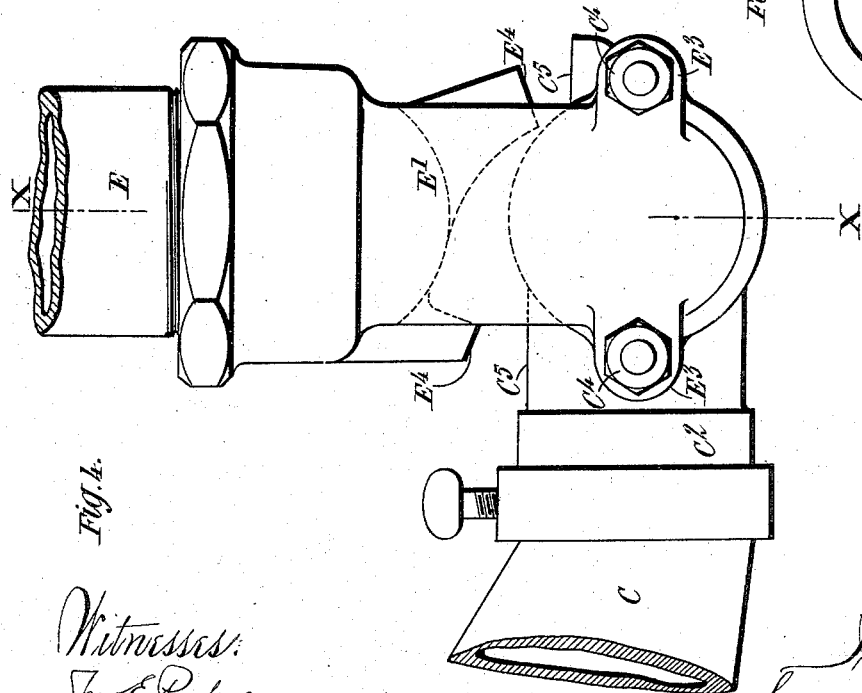

UNITED STATES PATENT OFFICE.

SAMUEL JAMES WILFORD, OF LONDON, ASSIGNOR TO ARTHUR ROSS, OF ST. CLEMENTS, ENGLAND.

DEVICE FOR CIRCULATING WATER OF BOILERS AND REMOVING IMPURITIES THEREFROM.

SPECIFICATION forming part of Letters Patent No. 534,773, dated February 26, 1895.

Application filed March 16, 1894. Serial No. 503,932. (No model.)

*To all whom it may concern:*

Be it known that I, SAMUEL JAMES WILFORD, engineer, a subject of the Queen of Great Britain, residing at 72 Worship Street, in the city of London, England, have invented certain new and useful Improvements in Devices for Circulating the Water of Boilers and the Like and Removing Impurities Therefrom, of which the following is a specification, reference being had to the accompanying drawings.

This invention relates to improvements in devices for circulating the water of boilers and the like, and removing impurities therefrom, said devices being in certain respects similar to those described in the specifications of Letters Patent No. 276,410 and No. 276,411, granted to J. F. Hotchkiss.

The principal object of this invention is to construct the said devices so that they will operate automatically after being charged, to start and continue the circulation of the water in the boiler or other main container.

Another object of this invention is to construct such devices with valves capable of operating automatically to shut off the said devices from the boiler or the like in the event of accident to them or to their connections.

This invention comprises also, means for freeing the reservoir and connections from air; means for maintaining the mouth of the funnel at a constant position with regard to the water level in the boiler, despite variation of the latter; and further improvements hereinafter specified.

In order that the said invention may be clearly understood I will now proceed to describe the same with reference to the accompanying drawings, wherein—

Figure 1:
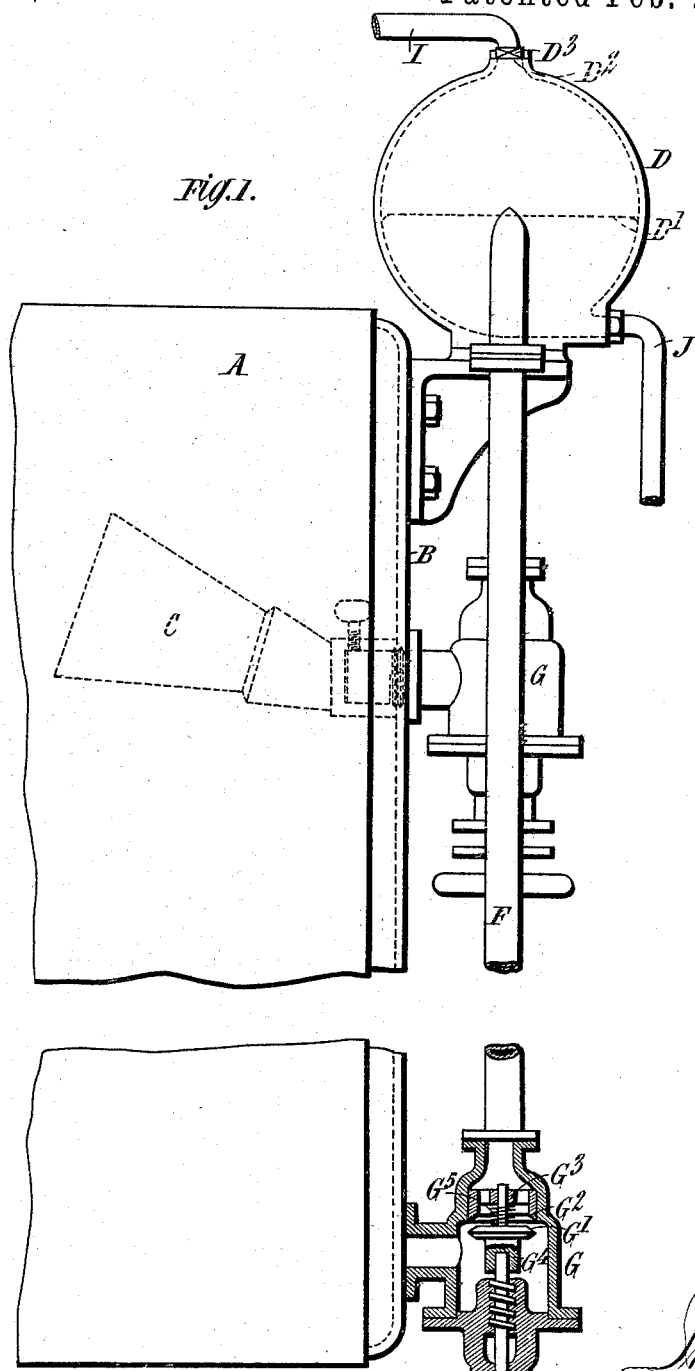
Figure 2:
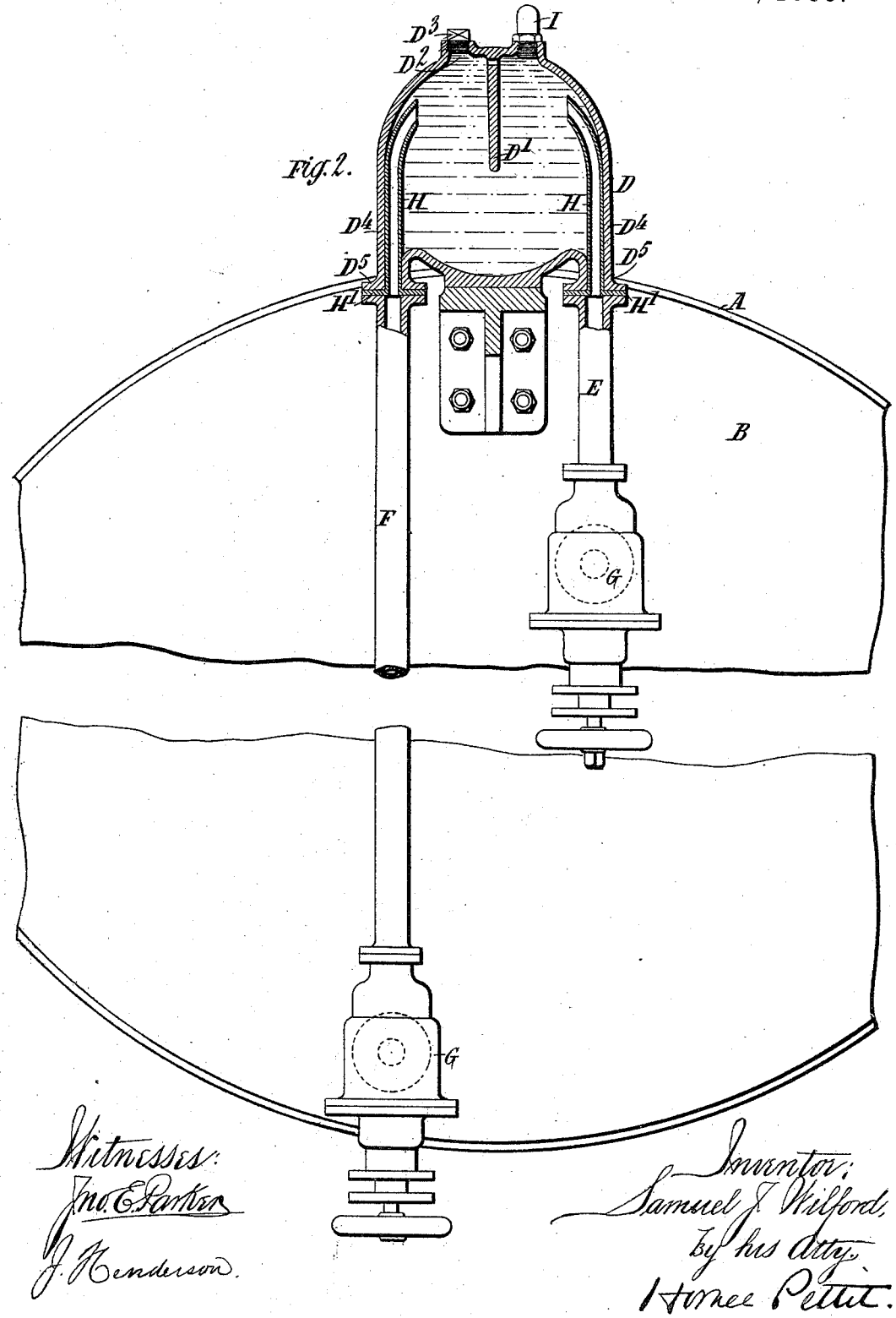
Figure 3:
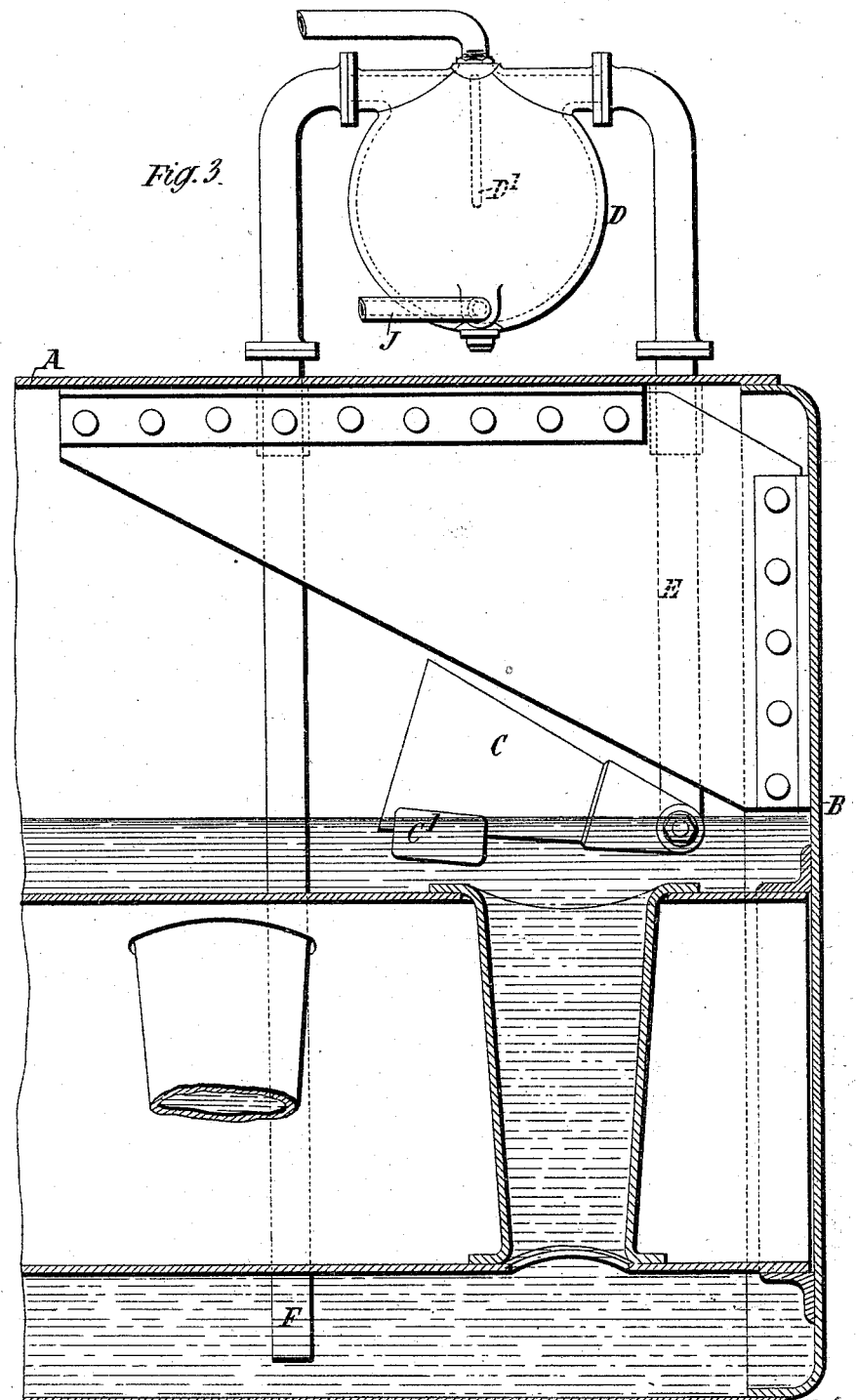

Figure 1 is a side elevation, partly in section, of one end of a boiler with a circulating and purifying device according to this invention. Fig. 2 is an end elevation, partly in section, of the boiler and appurtenances shown in Fig. 1. Fig. 3 is a longitudinal central section of the rear portion of a boiler fitted with other improvements according to this invention. Fig. 4 is a side elevation of one form of joint for the connection of a rising and falling funnel and the up-flow pipe. Fig. 5 is a section on the line X X, of Fig. 4, and Fig. 6 is an elevation of a detail of Figs. 4 and 5.

Like letters indicate corresponding parts throughout the drawings.

A is the boiler shell.
B is the end plate.
C is the internal funnel.
D is the reservoir, with a baffle D' therein. The baffle may be dispensed with, if desired.
E is the up-flow pipe, which connects the apex of the funnel with the reservoir D.
F is the return pipe, which leads from the reservoir to the lower part of the interior of the boiler.

With reference particularly to Figs. 1 and 2, G G are valves placed as near as possible to the points at which the up-flow and return passages are made in the boiler.

$D^2$ is a charging orifice in the reservoir, closed by a screw-plug $D^3$.

By closing both the valves G the reservoir and the pipe connections can be fully charged with liquid through the charging orifice $D^2$, so that after the valves are reopened and as soon as there is any difference between the temperature of the water in the boiler, and in the reservoir, circulation will start. Formerly it was necessary to wait until the apparatus became automatically charged before circulation could begin, and this was a disadvantageous feature of the apparatus inasmuch as the occurrence of automatic charging could not take place immediately upon commencement of the heating of the contents of the boiler or the like, but required the generation of a pressure of steam sufficient at least to balance the head of water in the apparatus and to expel the air therefrom.

Cocks might be substituted for the valves G, to permit of the charging of the reservoir and pipe connections aforesaid but in the example illustrated by Figs. 1 and 2 the valves G are of special construction and are employed to perform automatically an additional function, that is to say—each valve comprises a disk G' beveled at its edges to seat upon the seating $G^2$ and provided with a guide stem extending through a guide $G^3$ fixed in the shell and also with a collar $G^4$ which receives but is not connected to the end of the valve spindle. Between the disk G' and the guide G³ a spring G⁵ is placed. This spring is of sufficient strength to move the disk G' away from its seating when the end of the valve-spindle is moved away from the disk, but in the event of any excessive rush of steam or water through the apparatus, owing to accident to the reservoir or its connections, the spring will not offer any material resistance to the closing of the valve automatically by the flow of fluid. For the automatic disks G' any equivalent automatic valves operating for a like purpose can be substituted.

The funnel C or its equivalent is preferably hinged or otherwise flexibly connected to the up flow pipe E, as for instance in Fig. 3 and is provided with a float C' or the like, whereby its larger end is caused to rise and fall so as to maintain constantly the proper working position relatively to the water-level in the boiler which may change from time to time.

A suitable form of junction of the funnel C and up-flow pipe E is shown in Figs. 4 and 5 wherein E' is a casting secured to the bottom of the up-flow pipe and provided with two channels E², the ends of which are presented toward each other as shown. Into the gap between the opposed ends of the channels E² a hollow trunnion C² is introduced. The interior of this trunnion communicates with the interior of the funnel and with the two channels E². To keep the trunnion in its proper place relatively to the two channels a pair of rings C³ is placed thereon as shown. Each of these rings makes a joint, upon its interior circumference, with one end of the trunnion, which is free to turn in the rings and the said rings are firmly secured by bolts C⁴ or otherwise to lugs E³ on the casting E'.

E⁴, E⁴ are lugs which limit the movement of the trunnion and lie in the path of projections C⁵ thereon; or a length of flexible hose may be used to connect the funnel and the up-flow pipe; but I wish it to be clearly understood that I do not limit this part of my invention to the use of any particular type of joint for the purpose aforesaid.

The reservoir is cast or otherwise formed with flanged connections D⁴ for the up-flow and return pipes, preferably integral therewith. Within the said connections I preferably place tubes H of copper or other suitable material (see Fig. 2) which are extended up toward the crown of the reservoir and at their lower ends are provided with flanges H' which lie against and concentric with the flanges D⁵ of the connections aforesaid. By using tubes thus constructed and arranged I am enabled to introduce and withdraw the water at the desired points in the reservoir without complicating the construction of the same or introducing superfluous joints.

To enable the apparatus to be used for removing oil and similar light impurities from the water I connect a blow-off pipe I to the upper part of the reservoir, through which the oil and such other impurities as will rise to the upper part of the reservoir, can be blown off. A suitable valve is provided in the said pipe, to control the blowing-off. At the top of the reservoir I provide a blow-off orifice for air. I may use the charging orifice D³ or the oil blow-off I for this purpose; or I connect the air way with a pump, aspirator, condenser, or other device which can be used to exhaust the air wholly or partially from the reservoir and the pipe connections.

In the improved apparatus I utilize a bottom blow-off or sediment pipe J as in the apparatus described in the specification of the said prior patent.

A suitable mud-hole or inspection orifice can be provided in the reservoir if desired.

What I claim is—

1. The combination with a heater for liquid, of a circulator and purifier, comprising a reservoir placed above the level of the water in the heater and fitted with a bottom blow-off pipe, and up-flow and return pipes connecting the reservoir and the heater, valves for opening and closing the said upflow and return pipes placed in proximity to the points at which said pipes join the heater, said valves being loosely mounted on their respective spindles so as to be automatically closed by a sudden rush of water or steam from the heater through the circulator, substantially as set forth.

2. The combination with a heater for liquid, of a circulator and purifier comprising a reservoir placed above the level of the water in the heater and having a charging orifice with means for opening and closing the same in its upper part and fitted with a bottom blow-off pipe, and up-flow and return pipes connecting the reservoir and the heater, valves for opening and closing the said up-flow and return pipes placed in proximity to the points at which said pipes join the heater, said valves being loosely mounted on their respective spindles so as to be automatically closed by a sudden rush of water or steam from the heater through the circulator, substantially as set forth.

3. The combination with a heater for liquid, of a circulator and purifier, comprising a reservoir placed above the level of the water in the heater, and fitted with a bottom blow-off pipe, and up-flow and return pipes connecting the reservoir and the heater, valves for opening and closing said up-flow and return pipes placed in proximity to the points at which said pipes join the heater, said valves being loosely mounted on their respective spindles so as to be automatically closed by a sudden rush of water or steam from the heater, an air-outlet provided at the upper part of the reservoir, and means for opening and closing the said outlet, substantially as set forth.

4. In a circulator and purifier for liquid, the combination with a reservoir fitted with a bottom blow-off and up-flow and return pipes connecting the reservoir and the heater, of a buoyant funnel, a hollow trunnion forming part thereof, a hollow casting secured to the bottom of the up-flow pipe, and having two branches with their ends opposed, and removable annular bearings for the trunnion, secured at the mouths of the branches substantially as set forth.

5. In a circulator and purifier for liquid, the combination with a reservoir fitted with a bottom blow-off and up-flow and return pipes, of valve shells forming a junction between the up-flow pipe and the heater and the return pipe and the heater, each shell being fitted with a disk, a weak spring, retained between one side of the disk and a part of the shell, and a screw-spindle, substantially as set forth for the purpose specified.

6. In a circulator and purifier for liquid, the combination with a reservoir fitted with a bottom blow-off and up-flow and return pipes connecting the reservoir to the heater, of automatic safety valves for closing said up-flow and return pipes placed in proximity to the points at which they join the heater, and internal pipes provided with flanges and placed within the up-flow and return connections of the reservoir, substantially as set forth.

In testimony whereof I have hereunto set my hand this 9th day of February, 1894.

SAMUEL JAMES WILFORD.

Witnesses:
WM. JNO. TENNANT,
P. DEVIN.